(12) United States Patent
Okazaki et al.

(10) Patent No.: US 6,981,704 B2
(45) Date of Patent: Jan. 3, 2006

(54) GASKET

(75) Inventors: Nobumitsu Okazaki, Okayama (JP); Seizo Watanabe, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/617,790

(22) Filed: Jul. 14, 2003

(65) Prior Publication Data

US 2004/0056429 A1  Mar. 25, 2004

Related U.S. Application Data

(63) Continuation of application No. PCT/JP02/07106, filed on Jul. 12, 2002.

(51) Int. Cl.
  *F16J 15/02*  (2006.01)

(52) U.S. Cl. ............ 277/638; 277/644; 277/649; 277/650

(58) Field of Classification Search ................ 277/594, 277/598, 637, 638, 641, 642, 644, 648, 649, 277/465, 611, 612
See application file for complete search history.

(56) References Cited

U.S. PATENT DOCUMENTS

| | | | | |
|---|---|---|---|---|
| 3,052,478 A | * | 9/1962 | Horvereid | 277/394 |
| 3,214,182 A | * | 10/1965 | Herbruggen | 277/465 |
| 3,584,889 A | * | 6/1971 | Sheets | 277/626 |
| 3,799,501 A | * | 3/1974 | Hartman | 251/306 |
| 4,434,909 A | * | 3/1984 | Ott | 220/316 |
| 5,002,290 A | * | 3/1991 | Pernin | 277/649 |
| 5,076,557 A | * | 12/1991 | Beatenbough et al. | 277/312 |
| 5,088,745 A | * | 2/1992 | Peppiatt et al. | 277/579 |
| 5,536,018 A | * | 7/1996 | Szott | 277/313 |
| 5,551,705 A | * | 9/1996 | Chen et al. | 277/648 |
| 5,687,976 A | * | 11/1997 | Andrick et al. | 277/607 |
| 6,065,757 A | * | 5/2000 | Schneider et al. | 277/641 |
| 6,129,358 A | * | 10/2000 | Kiesel et al. | 277/436 |
| 6,264,206 B1 | * | 7/2001 | Hashizawa et al. | 277/641 |
| 6,719,302 B2 | * | 4/2004 | Andrick | 277/604 |

FOREIGN PATENT DOCUMENTS

| | | | |
|---|---|---|---|
| JP | 10-9395 | * | 1/1998 |
| JP | 2000-161496 | * | 6/2000 |
| JP | 2003-172453 | * | 6/2003 |

* cited by examiner

Primary Examiner—Alison K. Pickard
(74) Attorney, Agent, or Firm—Wenderoth, Lind & Ponack, L.L.P.

(57) ABSTRACT

A longitudinally-endless gasket mounted into a groove portion formed in one of members to provide sealing between this one member and another of the members when they are fastened to each other. The gasket has a sectional shape corresponding to a sectional shape of the groove portion with a ratio (H/W) between a height (H) and a width (W) of the sectional shape being 0.8 to 5.0. The gasket is provided with a plurality of large projecting portions at intervals of 30 to 100 mm and a plurality of small projecting portions at intervals of 5 to 15 mm in a longitudinal direction of the gasket. A width (R2) of each large projecting portion is larger than a width (X) of the groove portion by 0.01 to 0.9 mm. A width (R1) of each small projecting portion is smaller than the width (X) of the groove portion by 0.01 to 0.6 mm. A filling rate of the groove portion by the gasket when the members are fastened to each other is 80 to 100%.

6 Claims, 6 Drawing Sheets

COMPRESSION RATE

GASKET

This application is a continuation of International Application No. PCT/JP02/07106, with an international filing date of Jul. 12, 2002.

BACKGROUND OF THE INVENTION

1. Field of the Invention

The present invention relates to a sealing arrangement between members in close contact with each other, and to a longitudinally-endless gasket mounted in a groove portion formed in one of the members to provide sealing between this one member and another of the members when they are fastened to each other.

For example, the present invention relates to a sealing arrangement between an intake manifold and a cylinder head in an engine mounted to an automobile or the like.

To put it more concretely, the invention relates to a longitudinally-endless gasket mounted in a groove portion formed in a face of an intake manifold disposed to face a cylinder head of an engine. The face of the intake manifold in which the groove portion is formed also faces the cylinder head of the engine. When the intake manifold and the cylinder head are fastened to each other, the longitudinally-endless gasket mounted in the groove portion provides sealing therebetween.

2. Description of the Related Art

As a longitudinally-endless gasket mounted in a groove portion formed in one of members to provide sealing between this one member and another of the members when they are fastened to each other, there is a known gasket for providing sealing between an intake manifold and a head member of an engine mounted to an automobile or the like.

Conventionally, as a gasket for providing sealing between an intake manifold and a head member of an engine mounted to an automobile or the like, a rubber gasket made of an elastic body such as synthetic rubber and having a rectangular or oval sectional shape is used.

The rubber gasket for the intake manifold is inserted into a groove portion formed in a face of the intake manifold facing the cylinder head during a mounting operation process. At this time, many portions of the rubber gasket are inserted into the groove portion and a tip end side is exposed from the groove portion. A face of the tip end side exposed from the groove portion is brought into contact with the cylinder head during a succeeding tightening operation. When the intake manifold and the cylinder head are fastened to each other during this tightening process, the rubber gasket is brought into close and tight contact with inner walls of the groove portion of the intake manifold and the cylinder head through compressive elastic deformation, thereby a required sealing operation can be obtained. Fastening of the intake manifold and the cylinder head to each other during the tightening process is normally performed by using fasteners such as bolts disposed in a vicinity of the groove portion.

In such a prior-art rubber gasket, there were problems such as incomplete insertion of the gasket into the groove portion during an operation process of mounting the gasket into the groove portion of the intake manifold, and falling of the rubber gasket during the tightening process.

Figure 11:
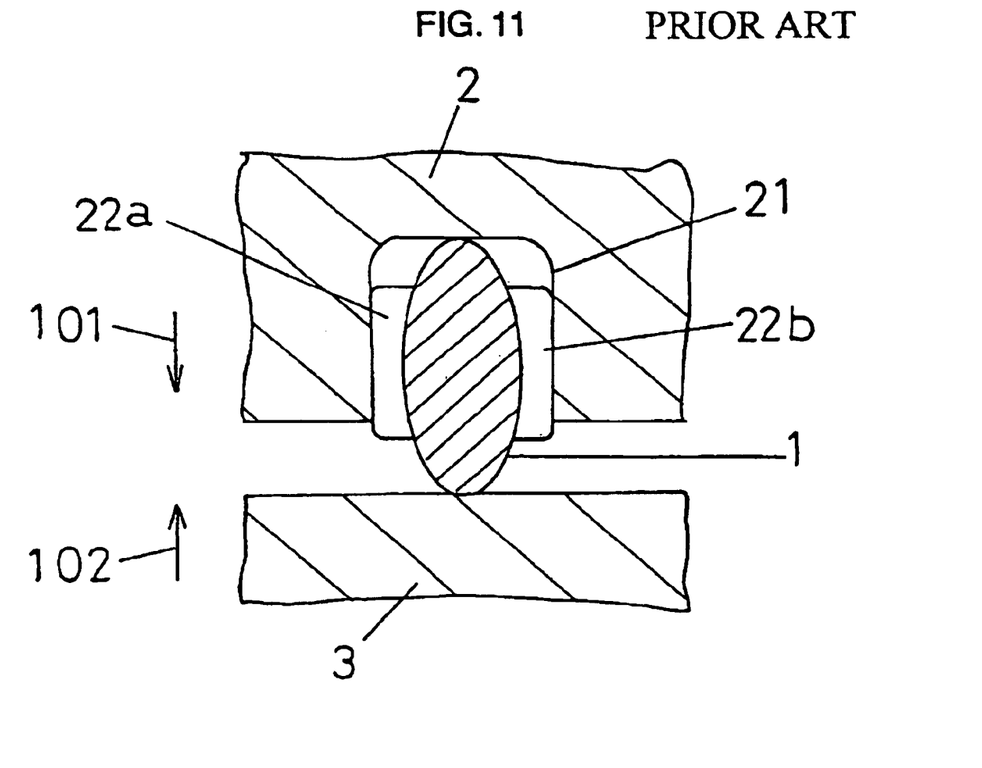
FIG. 11 is a sectional view of an example of mounting of a prior-art gasket for an intake manifold.

In other words, to describe it by referring to the drawings, as shown in FIG. 11, a prior-art gasket for the intake manifold, e.g., a rubber gasket 1 formed of an elastic body such as synthetic rubber or the like is formed into a shape of a thin O-ring having an oval sectional shape which is long in a vertical direction to meet a recent demand for weight reduction. Such a rubber gasket 1 has a poor shape maintaining property because of its thin shape. Therefore, it is difficult to quickly and reliably insert the gasket during an operation process of mounting the gasket within the groove portion 21 of intake manifold 2. After inserting the rubber gasket 1 into the groove portion 21, a tightening operation for fastening the intake manifold 2 and cylinder head 3 in directions shown with arrows 101 and 102 is performed at a tightening torque of about 4.9 MPa to 9.8 MPa by using fasteners such as bolts or the like disposed in a vicinity of the groove portion. During this tightening process, because the rubber gasket 1 is in the shape of an O-ring having an oval sectional shape which is long in the vertical direction, the gasket 1 is likely to be displaced outwardly from the groove portion 21 and to fall diagonally relative to a fastening direction.

In a normal assembly line of an engine of an automobile, after the rubber gasket 1 is mounted into the groove portion 21 of the intake manifold 2, a mounting face of the intake manifold 2 is turned around into a state shown in FIG. 11. Then, an operation for tightening the intake manifold 2 and the cylinder head 3 against each other is performed.

If structure, such as elastic projecting portions 22a, 22b, and the like, provided on opposite side faces of the rubber gasket 1 facing opposite inner wall faces of the groove portion 21, for preventing the rubber gasket 1 from falling, is insufficient, the rubber gasket 1 falls from the groove portion 21 during turning of the intake manifold 2, an inserted position is displaced to cause poor sealing, or more serious damage is caused in some cases.

If large structure for preventing falling of the rubber gasket 1 is provided in order to cope with the above problems, it becomes difficult to insert the rubber gasket 1 into the groove portion 21.

Therefore, a gasket which has excellent workability such that mounting and tightening operations can be performed easily and which can be reliably mounted is required.

Because the gasket for the intake manifold, formed into a shape of a thin O-ring having an oval sectional shape which is long in the vertical direction to meet the recent demand for weight reduction, is likely to fall when it is subjected to strong tightening, a compression rate is set at a low value to cope with this problem. However, low tightening for which the compression rate is set at a low value exerts a considerable bad influence on a sealing property.

The before described problems of the gasket for the intake manifold of the engine mounted to the automobile or the like are common to a longitudinally-endless gasket (e.g., a rocker cover gasket, a front cover gasket, an oil pan gasket, a timing chain cover gasket, and the like) mounted within a groove portion formed in one of members to provide sealing between this one member and another of the members when they are fastened to each other.

In view of the above-described problems of the longitudinally-endless gasket for providing sealing between one member and another of the members when they are fastened to each other, it is an object of the present invention to provide a gasket which has excellent workability such that mounting and tightening operations can be performed easily and which can exert satisfactory sealing performance.

SUMMARY OF THE INVENTION

To solve the above problems, a gasket proposed by the invention has a sectional shape corresponding to a sectional shape of a groove portion in which the gasket is to be fitted. A ratio (H/W) between height (H) and width (W) of a cross section is in a specific range. The gasket is provided with a plurality of large projecting portions and a plurality of small projecting portions respectively at predetermined intervals (P), (p) in a longitudinal direction, wherein each of the projecting portions includes projections projecting from opposite side faces of the gasket. There are predetermined differences (AX), (Δx) between widths (R2), (R1) of the small and large projecting portions and a width (X) of the groove portion. A filling rate of the groove portion by the gasket when one member, having the groove portion in which the gasket is fitted, and another member are fastened to each other is 80 to 100%.

BRIEF DESCRIPTION OF THE DRAWINGS

FIG. 5(*a*) is a plan view of an example of the gasket of the invention;

FIG. 5(*b*) is a sectional view taken along a line C—C in FIG. 5(*a*);

FIG. 5(*c*) is a sectional view taken along a line D—D in FIG. 5(*a*);

FIG. 5(*d*) is a sectional view taken along a line E—E in FIG. 5(*a*);

DETAILED DESCRIPTION OF THE PREFERRED EMBODIMENTS

The gasket of the present invention which is employed as a gasket for an intake manifold of an engine mounted to an automobile or the like will be described below in detail by referring to the accompanying drawings.

A gasket 4 of the invention is a longitudinally endless gasket to be mounted within a groove portion 21 formed in a face of an intake manifold 2 disposed to face a cylinder head 3. The face of the intake manifold 2 in which the groove portion 21 is formed also faces the cylinder head 3. When the intake manifold 2 and the cylinder head 3 are fastened to each other, the gasket 4 mounted within the groove portion 21 provides sealing therebetween.

The gasket 4 of the invention has a sectional shape corresponding to a sectional shape of the groove portion 21.

A ratio (H/W) between height (H) of a section of the gasket 4 of the invention in a depth direction of the groove portion 21 formed in the intake manifold 2 and width (W) of a section in a width direction of the groove portion 21 is 0.8 to 5.0.

Figure 3:
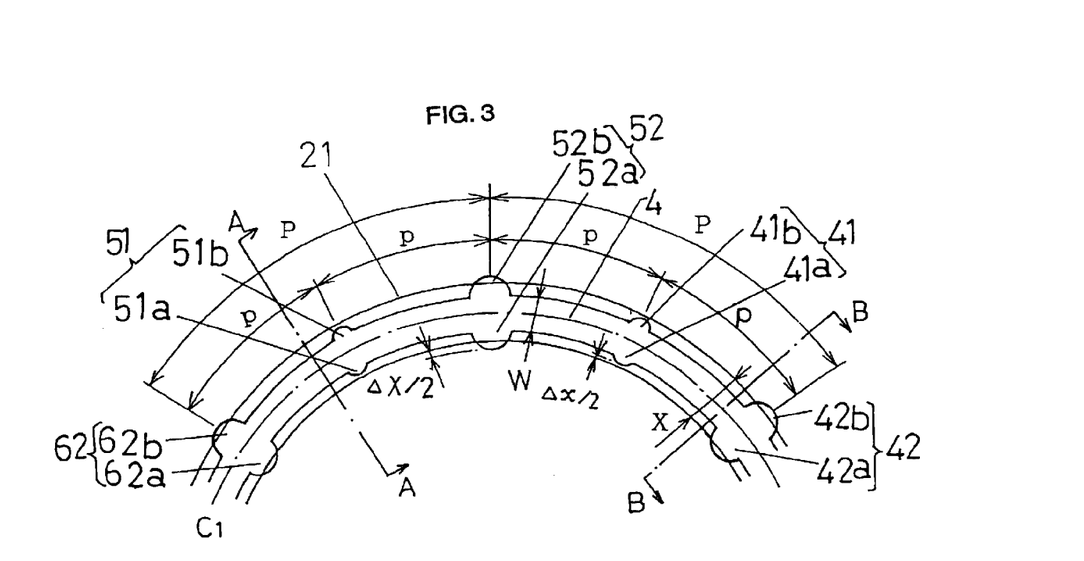
FIG. 3 is a plan view of the gasket shown in FIG. 1 and mounted in a groove portion of an intake manifold with the gasket viewed from a side of a cylinder head and with a portion omitted.

As shown in FIG. 3, the gasket 4 of the invention includes in a longitudinal direction thereof a plurality of large projecting portions 42 formed from projections 42*a*, 42*b* projecting from opposite side faces of the gasket, facing opposite inner wall faces of the groove portion 21 formed in the intake manifold 2, toward the opposite inner wall faces of the groove portion 21.

As shown in FIG. 3, the gasket 4 of the invention includes in a longitudinal direction thereof a plurality of small projecting portions 41 formed from projections 41*a*, 41*b*, projecting from the opposite side faces of the gasket, facing the opposite inner wall faces of the groove portion 21 formed in the intake manifold 2, toward the opposite inner wall faces of the groove portion 21.

Figure 2:
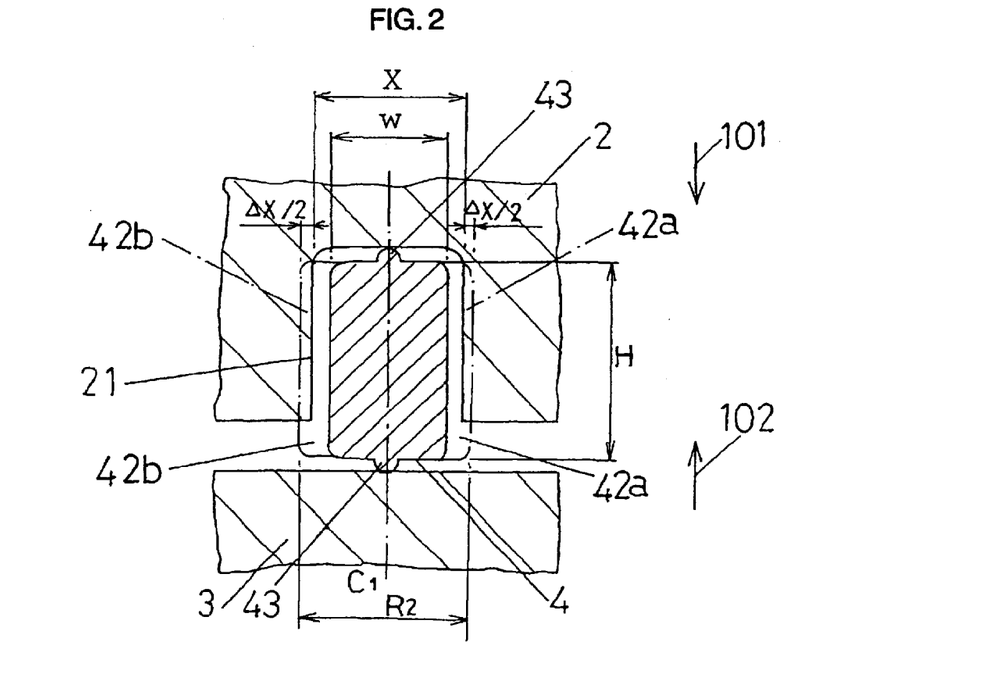
FIG. 2 is a sectional view of the example of mounting of the gasket of FIG. 1 taken at another position.

The large projecting portions 42 adjacent to each other in the longitudinal direction of the gasket 4 are disposed at intervals (P) of 30 to 100 mm. Dimension (R2) of each of the large projecting portions 42 in a width direction of the groove portion 21 is larger than a dimension (X) of the groove portion 21 in the width direction by 0.01 mm to 0.9 mm. The dimension (R2) of the large projecting portions 42 in the width direction is shown in FIG. 2, showing a section taken along line B—B in FIG. 3.

Figure 1:
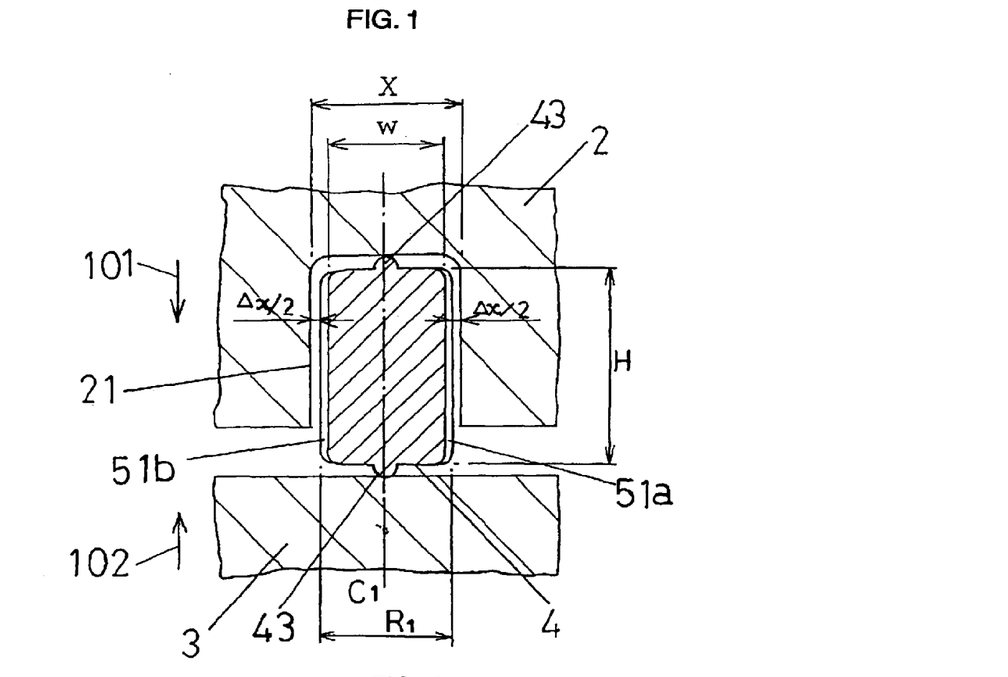
FIG. 1 is a sectional view of an example of mounting of a gasket of the present invention.

The small projecting portions 41 are disposed with intervals (p) of 5 to 15 mm between the small projecting portions adjacent to each other, and between the large projecting portions and small projecting portions adjacent to each other in the longitudinal direction of the gasket 4. Dimension (R1) of each of the small projecting portions 41 in the width direction of the groove portion 21 is smaller than dimension (X) of the groove portion 21 in the width direction by 0.01 mm to 0.6 mm. The dimension (R1) of each of the small projecting portions 41 in the width direction is shown in FIG. 1, showing a section taken along line A—A in FIG. 3.

In addition to the above constitution/structures, a filling rate of the groove portion 21 by the gasket 4 of the invention when the intake manifold 2 and the cylinder head 3 are fastened to each other is 80 to 100%.

Figure 4:
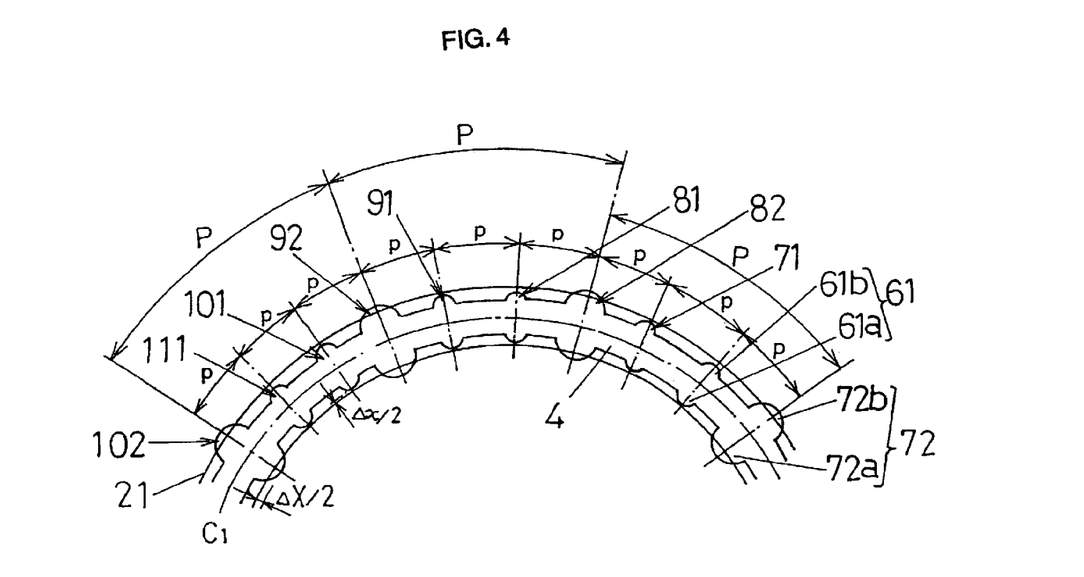
FIG. 4 is a plan view of another gasket of the invention and mounted in the groove portion of the intake manifold with the gasket viewed from the side of the cylinder head and with a portion omitted.

The gasket of the invention is of an annular shape which is endless in a longitudinal direction. A portion of the annular gasket 4 is shown in FIGS. 3 and 4, which show a state in which the gasket 4 is mounted in the groove portion 21 of the intake manifold 2 viewed from a side of the cylinder head 3.

The gasket of the invention can be formed by using lightweight material which can meet the demand for weight reduction of an engine and the like of an automobile. As such light weight material, synthetic resin material and lightweight metal material which are known in the art can be used.

As the synthetic resin material, there is synthetic rubber material, for example. The gasket of the invention, and produced by a known method by using the synthetic rubber material, becomes a rubber gasket.

As synthetic rubber material, butyl rubber, styrene-butadiene copolymer, ethylene-vinyl acetate copolymer, ethylene-methyl acrylate copolymer, ethylene-ethyl acrylate copolymer, butadiene rubber, nitrile rubber, hydrogenated nitrile rubber, acrylic rubber, silicon rubber, fluorine rubber, fluorosilicon rubber, ethylene propylene rubber, and the like can be employed.

As lightweight metal material, aluminum, magnesium, and the like can be employed.

The gasket of the invention can be produced by using the above-described synthetic rubber material and lightweight metal material and by using a producing method employed conventionally in the art.

Because the gasket of the invention includes the above-described large projecting portions 42 having characteristic structures, it is possible to reduce risks of poor sealing caused by falling of the gasket from the groove portion 21 or displacement of an inserted position of the gasket during a mounting operation process and a tightening process. Therefore, a mounting operation and a tightening operation can be performed easily.

Because the gasket includes the above-described small projecting portions 41 having characteristic structures, it is possible to effectively prevent generation of a lateral drift or falling down of the gasket during the tightening process.

Because of the above-described cross sectional shape, the specific ratio (H/W) between the height (H) and the width (W) of the section shown in FIGS. 1 and 2, and the above-described filling rate in addition to the constitution/structure having the small projecting portions and the large projecting portions, the gasket can exert an excellent sealing performance.

The before described sectional shape of the gasket of the present invention corresponding to the sectional shape of the groove portion refers to such a correspondence that an outer wall face (opposite side faces and an upper face in FIGS. 1 and 2) of the gasket 4 is disposed along the inner wall faces of the groove portion 21 and fits well within the groove portion 21 as shown in FIGS. 1 and 2 when the gasket 4 is inserted into the groove portion 21 during the mounting operation process. This means that the sectional shape of the gasket 4 is of a substantially rectangular shape as shown in FIGS. 1 and 2 to correspond to the sectional shape of the groove portion 21 when the sectional shape of the groove portion 21 formed in the face of the intake manifold 2 facing the cylinder head 3 is of a substantially rectangular shape, for example, as shown in FIGS. 1 and 2. As a result, the inner wall faces of the groove portion 21 and the outer wall faces of the gasket 4 are in uniform contact with each other to allow the gasket 4 to fully exert its elasticity when the intake manifold 2 and the cylinder head 3 are fastened to each other.

With regard to the ratio (H(W) between the height (H) and the width (W) of the cross section being 0.8 to 5.0 as described above, it is preferable that the ratio is in this range for a reason that respective faces (upper and lower faces and opposite side faces in FIGS. 1 and 2) of the gasket 4 can respectively be in uniform contact with a bottom face and opposite inner wall faces of the groove portion 21 and the cylinder head 3 when the intake manifold 2 and the cylinder head 3 are fastened to each other and the gasket 4 can exert its elasticity to obtain a high sealing force.

The dimension of each large projecting portion is as described above, i.e., $\Delta X/2 + \Delta X/2 = \Delta X = 0.01$ to 0.9 mm in FIGS. 2 to 4, because this dimension is preferable in order to smoothly insert the gasket 4 into the groove portion 21 and to reduce risks of poor sealing caused by falling of the gasket 4 from the groove portion 21 or displacement of an inserted position of the gasket during the mounting operation process and the tightening process.

Here, the dimension of the large projecting portion is preferably $\Delta X/2 + \Delta X/2 = \Delta X = 0.1$ to 0.3 mm in FIGS. 2 to 4, in order to exert the before described effects.

The above-described interval (P) at which the large projecting portions are provided in the longitudinal direction of the gasket, the interval (p) at which the small projecting portions are provided in the longitudinal direction of the gasket, and the above-described dimension of the small projecting portion, i.e., $\Delta x/2 + \Delta x/2 = \Delta x = 0.01$ to 0.6 mm in FIGS. 1, 3, and 4, are desirable for the following reasons. With the above intervals and dimension, it is possible to effectively prevent lateral drift and falling of the gasket during the tightening operation while corresponding to the above-described dimension of the large projecting portion. Moreover, the above intervals and dimension are desirable because the respective faces (upper and lower faces and opposite side faces in FIGS. 1 and 2) of the gasket 4 can respectively be in uniform contact with the bottom face and opposite inner wall faces of the groove portion 21 and the cylinder head 3, and the gasket 4 can exert its elasticity to obtain a high sealing force with such intervals and dimension together with the above-described cross sectional shape, the above-described specific ratio (H/W) between the height (H) and the width (W), and the above-described filling rate when the intake manifold 2 and the cylinder head 3 are fastened to each other.

The dimension of each small projecting portion is preferably in a range of $\Delta x/2 + \Delta x/2 = 0.1$ to 0.3 mm in order to better exert the before described effects.

As dimensions of the above large projecting portions 42 and small projecting portions 41, the following examples can be given, where the width of the groove portion 21 is (X), a width of a section of the gasket at a position at which the small projecting portion 41 is provided and in the width direction of the groove portion 21 is (R1), and a width of a section of the gasket at a position at which the large projecting portion 42 is provided and in the width direction of the groove portion 21 is (R2).

| X (mm) | R1 (mm) | R2 (mm) |
| --- | --- | --- |
| 2 | 1.9 | 2.1 |
| 2 | 1.7 | 2.3 |
| 3 | 2.9 | 3.1 |
| 3 | 2.7 | 3.3 |
| 4 | 3.9 | 4.1 |
| 4 | 3.7 | 4.3 |
| 5 | 4.9 | 5.1 |
| 5 | 4.7 | 5.3 |
| 7 | 6.9 | 7.1 |
| 7 | 6.7 | 7.3 |
| 10 | 9.9 | 10.1 |
| 10 | 9.7 | 10.3 |

Although the width (X) of the groove portion 21 is not limited to the above examples, with respect to various widths (X) of the groove portion 21, the gasket of the present invention can be provided by setting the large projecting portions and small projecting portions of dimensions so as to have a relationship shown in the above examples, the sectional shape so as to correspond to the sectional shape of the groove portion 21, the ratio (H/W) between the height (H) and the width (W) of the section so as to be 0.8 to 5.0, the intervals (P), (p) at which the large projecting portions and small projecting portions so as to be provided in the above-described ranges, and the filling rate of the groove portion 21 by the gasket when the intake manifold and the cylinder head are fastened to each other so as to be 80 to 100%.

In the gasket of the invention, the filling rate of the groove portion 21 by the gasket when the intake manifold 2 and the cylinder head 3 are fastened to each other is 80 to 100% as described above, because the filling rate in such a range in addition to the above-described constitution and structure including the small projecting portions and large projecting portions, the above-described cross sectional shape, and the specific ratio (H/W) between the height (H) and the width (W), is desirable in order to increase a compression rate when the intake manifold 2 and the cylinder head 3 are fastened to each other and to obtain a satisfactory sealing property.

In this specification, "the filling rate" refers to a percentage of volume of the gasket 4 in volume of the groove portion 21 when the intake manifold 2 and the cylinder head 3 are fastened to each other.

According to an experiment performed by the inventors of the present application, the filling rate of 85% is most desirable in order to enhance the compression rate and to obtain the satisfactory sealing property in the gasket of the invention.

Figure 6:
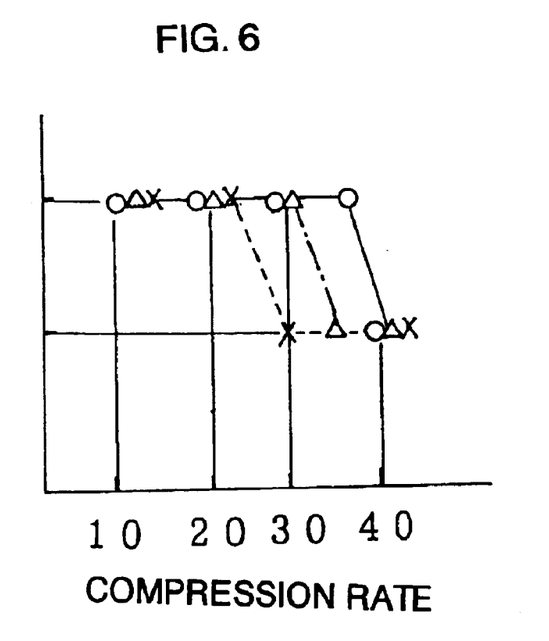
FIG. 6 shows results of an experiment pertaining to a relationship between a compression rate and an occurrence of falling when intervals are changed at which small projections are disposed on the gasket of the invention.

FIG. 6 shows a result of an experiment with regard to a relationship between compression rate and a likelihood of occurrence of falling of the gasket when the gasket (rubber gasket) of the invention is formed by using butyl rubber as a main material and the interval represented by reference character (p) in FIG. 3, i.e., the interval between the small projecting portions adjacent to each other and the interval between the small projecting portions and the large projecting portions adjacent to each other in the longitudinal direction of the gasket, are changed. In the rubber gasket subjected to the experiment, the lateral width (W)=1.6 mm, the relationship between the height and the width: H/W=3.6, the dimension of the small projecting portion: R1=2.8 mm, and the dimension of the large projecting portion: R2=3.2 mm. The rubber gasket of the invention was inserted into a groove portion having width (X)=3.0 mm and a depth of 4 mm, and an intake manifold having the groove portion and a head member are fastened to each other to perform the experiment. In FIG. 6, O represents a result of the experiment under a condition of p=5 mm. Δ represents that under a condition of p=15 mm, and X represents that under a condition of p=20 mm. A horizontal axis represents compression rate (%) (the compression rate increases rightwardly) and a vertical axis represents a likelihood of occurrence of falling of the gasket (the likelihood of occurrence of falling increases downwardly). From these experimental results, if (p) is larger than 15 mm, the likelihood of occurrence of falling of the gasket increases if the compression rate is increased so as to obtain a better sealing property. Therefore, it is preferable that (p) does not exceed 15 mm. In consideration of ease of production and the like, it is preferable that (p) is not smaller than 5 mm.

In the gasket of the invention, the interval (P) between the large projecting portions adjacent to each other in the longitudinal direction of the gasket is preferably in a range of 30 to 100 mm, and the interval (p) between the small projecting portions adjacent to each other and the interval (p) between the small projecting portions and the large projecting portions adjacent to each other in the longitudinal direction of the gasket are preferably in the range of 5 to 15 mm. It is possible to employ a form shown in FIG. 3 in which one of small projecting portions 41 and 51 is disposed between adjacent large projecting portion 42 and large projecting portion 52, and the other of small projecting portions 41 and 51 is between the large projecting portion 52 and large projecting portion 62, or it is also possible to employ a form shown in FIG. 4 in which a plurality of small projecting portions 61, 71, 81, 91, 101, and 111 are respectively disposed between adjacent large projecting portion 72 and large projecting portion 82, between large projecting portion 82 and large projecting portion 92, and between the large projecting portion 92 and large projecting portion 102.

There is no difference in exerted operation and effects between the form shown in FIG. 3 and the form shown in FIG. 4, as long as the gasket has a shape and a structural characteristic required of the gasket of the invention. However, it is preferable that at least one small projecting portion is disposed between the large projecting portions adjacent to each other to make sure that falling of the gasket, due to compressive lateral drift deformation during tightening, is prevented.

As shown in FIGS. 3 and 4, of the small projecting portions 41, 51, 61, projections 41a, 41b, 51a, 51b, 61a, and 61b, projecting from the opposite side walls of the gasket toward the inner wall faces of the groove portion 21 facing the opposite side walls, are preferably provided symmetrically with respect to a center line (C1) of the gasket 4. Of the large projecting portions 42, 52, 62, 72, projections 42a, 42b, 52a, 52b, 62a, 62b, 72a, and 72b, projecting from the opposite side walls of the gasket toward the inner wall faces of the groove portion 21 facing the opposite side walls, are preferably provided symmetrically with respect to the center line (C1) of the gasket 4. A purpose for this is to exert effects of facilitating an insertion process and better prevent failing of the gasket.

In addition to this, it is further advantageous that the dimension of each small projecting portion and the dimension of each large projecting portion, defining dimensions represented by Δx, ΔX in FIGS. 1 to 4, are set at such a condition of Δx=ΔX in one gasket (i.e., in the same gasket) from a viewpoint of ease of the insertion operation and an effect of preventing falling of the gasket. Each of the embodiments shown in FIGS. 1 to 4 shows a case of Δx=ΔX.

In the invention, the above-described intervals (P), (p,) are measured at positions of the center line (C1) of the gasket.

The above-described gasket of the invention may be formed into a structure in which an upper face and/or a lower face corresponding to a depth direction of the groove portion 21 of the intake manifold 2 are (is) respectively formed with ribs. FIGS. 1 and 2 show forms in which the upper face and lower face of the gasket 4 are respectively formed with ribs 43, 43.

Figure 7:
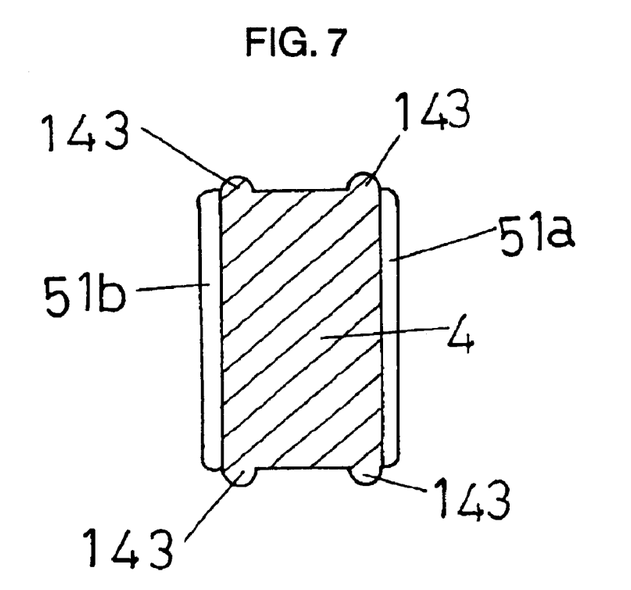
FIG. 7 is a sectional view showing another embodiment of the invention at a position corresponding to a section taken along a line A—A in FIG. 3.
Figure 8:
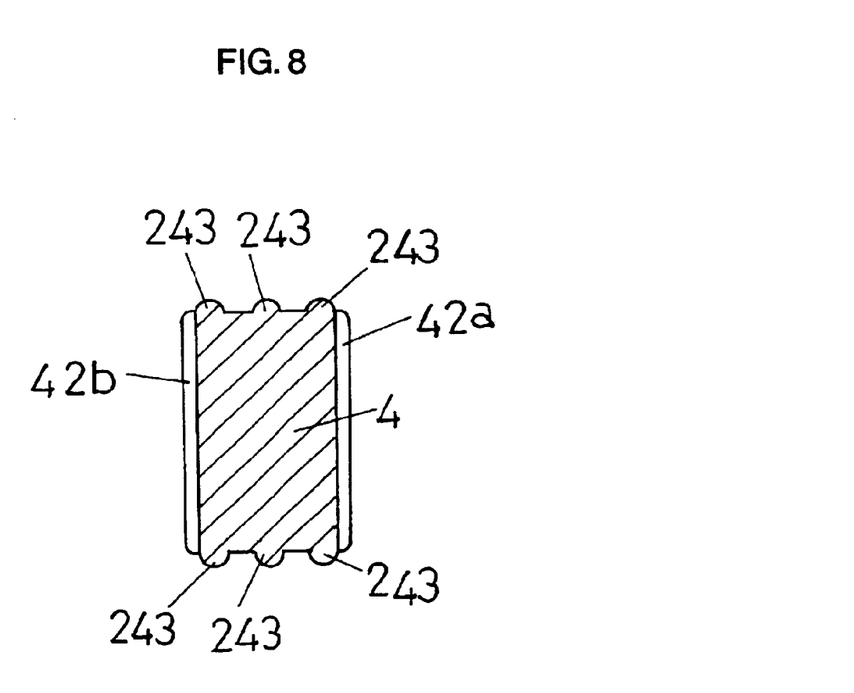
FIG. 8 is a sectional view showing still another embodiment of the invention at a position corresponding to a section taken along a line B—B in FIG. 3.

In this case, a structure in which the upper face and/or lower face of the gasket are (is) formed with a plurality of ribs at different positions in the width direction of the groove portion 21 of the intake manifold 2 is also possible. FIGS. 7 and 8 show forms in which the upper face and lower face of the gasket 4 are respectively formed with a plurality of ribs 143, 143, 243, 243, and 243 according to required functions.

It is advantageous to provide such ribs because a sealing performance can be enhanced. Provision of such ribs is advantageous because the upper and lower faces of the gasket, which respectively abut a bottom face of the groove portion 21 and an abutting face of the cylinder head 3, can be easily and elastically deformed in the width direction (i.e., a lateral direction in FIGS. 1 and 2) when the intake manifold 2 and the cylinder head 3 are fastened to each other.

Figure 9:
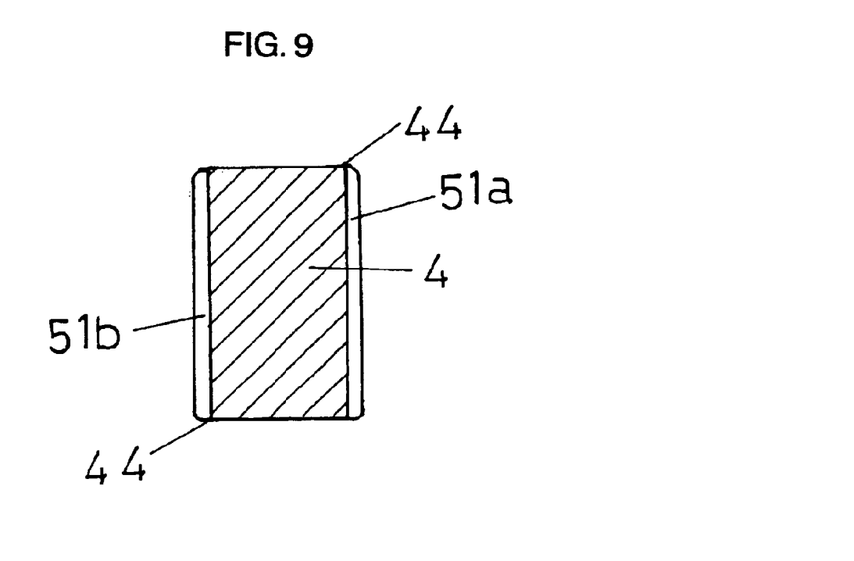
FIG. 9 is a sectional view showing still another embodiment of the invention at a position corresponding to a section taken along a line A—A in FIG. 3.
Figure 10:
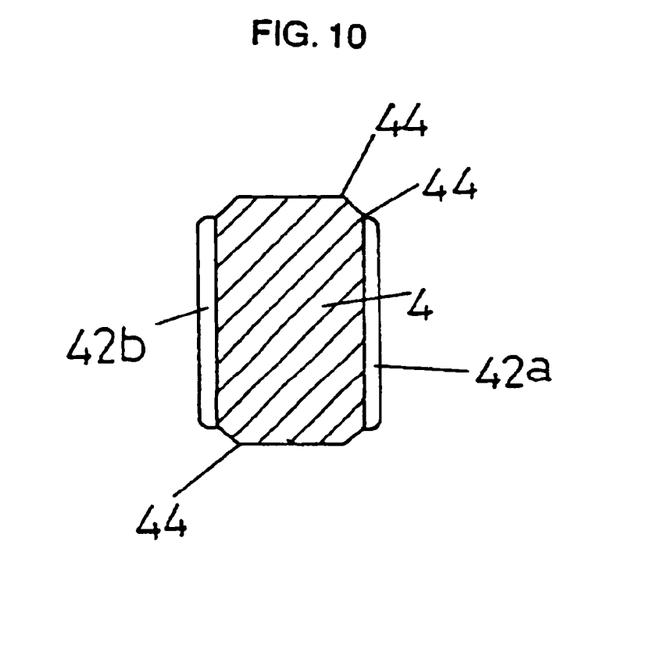
FIG. 10 is a sectional view showing still another embodiment of the invention at a position corresponding to a section taken along a line B—B in FIG. 3.

Furthermore, in the above-described gasket of the invention, if the sectional shape of the gasket is substantially rectangular, corner portions of the rectangular shape may be formed to have acute angles. For example, if the sectional shape of the groove portion 21 is substantially rectangular as shown in FIGS. 1 and 2, the sectional shape of the gasket is also substantially rectangular as shown in FIGS. 1 and 2 so as to correspond to the sectional shape of the groove portion 21. In this case, corner portions 44 are formed to have acute angles as shown in FIGS. 9 and 10.

Such acute-angled corner portions 44 function as edges which locally come into contact with corner portions of the bottom face of the groove portion 21 in the intake manifold 2 when the intake manifold 2 and the cylinder head 3 are fastened to each other. Surface pressure at each of the corner portions of the bottom face of the groove portion 21 is increased by local surface pressure generated at a local contact portion to ensure better sealing performance. In other words, an acute-angled edge formed at the corner portion 44 comes into local contact with an interior angle portion of the groove portion 21 by tightening of the intake manifold 2 and the cylinder head 3 to each other. Thus, local surface pressure is generated at this portion and a surface pressure of the corner portion is increased. In FIG. 10, although the corner portions are chamfered, the corner portions 44 are formed into acute-angled edges.

The gasket of the invention includes, as shown in FIGS. 1 to 4, the plurality of large projecting portions 42 formed with projections projecting from the opposite side faces facing the opposite inner wall faces of the groove portion 21 formed in the intake manifold 2, toward the opposite inner wall faces of the groove portion 21, and the plurality of small projecting portions 41 respectively at predetermined intervals (P), (p) in the longitudinal direction of the gasket. The dimensions (R2), (R1) of the large projecting portions 42 and the small projecting portions 41 in the width direction of the groove portion 21 are maintained at predetermined dimensions with respect to dimension (X) of the groove portion 21 in the width direction. Thus, falling of the gasket during mounting and falling of the gasket due to a compressive lateral drift deformation during tightening are prevented thoroughly.

In other words, the dimension (R2) of the large projecting portions 42 in the width direction of the groove portion 21 is larger than width (X) of the groove portion 21 by ΔX=0.01 mm to 0.9 mm while the dimension (R1) of the small projecting portions 41 in the width direction of the groove portion 21 is smaller than the width (X) of the groove portion 21 by Δx=0.01 mm to 0.6 mm. The large projecting portions 42 are provided at intervals of 30 to 100 mm and the small projecting portions 41 are provided at intervals of 5 to 15 mm. Moreover, the sectional shape of the gasket 4 corresponds to the sectional shape of the groove portion 21. In order to insert the gasket 4 into the groove portion 21, portions provided with the large projecting portions 42 are pushed into the groove portion 21 and are inserted while being pressed against the opposite inner walls of the groove portion 21. Then, other portions including portions provided with the small projecting portions 41 can be extremely easily fitted in the groove portion 21 while being pulled by the portions provided with the large projecting portions 42. Then, the gasket fits as shown in FIGS. 1 and 2.

The portions provided with the small projecting portions 41 are mounted along the wall face of the groove portion 21.

Therefore, if the intake manifold 2 and the cylinder head 3 are fastened in directions shown with arrows 101 and 102 by fasteners such as bolts or the like (not shown) from the state shown in FIGS. 1 and 2, the gasket 4 is compressed, sandwiched between the groove portion 21 and the cylinder head 3, and elastically deformed to come into contact with the inner faces of the groove portion 21 and the contact face of the cylinder head 3 through a large area of the gasket 4.

At this time, a gap (Δx) between each of the projections 41a, 41b, of the small projecting portions 41 and the opposite inner wall faces of the groove portion 21 is gradually narrowed due to deformation of a main body of the gasket 4 and the projections 41a, 41b, and come into contact with the inner wall faces of the groove portion 21. Thus, a lateral drift and falling of the gasket between the large projecting portions 42 can be effectively prevented.

On the other hand, because the projections 41a, 41b, 42a, 42b, of the small projecting portion 41 and the large projecting portion 42 are projecting from the main body of the gasket in directions of the side faces, they are not seriously affected by elastic deformation of the main body portion of the gasket 4 and are mounted into the groove portion 21 because of their shapes when they are inserted into the groove portion 21 for a first time as a starting point. Then, together with the characteristic structures such as the sectional shape corresponding to the sectional shape of the groove portion 21, the specific ratio (H/W) between the height (H) and the width (W) of the section, and the specific filling rate, a satisfactory sealing property can be exerted.

As described above, in the gasket of the invention, because the plurality of large projecting portions and the plurality of small projecting portions, having different dimensions (R2), (R1) in the width direction of the groove portion in which the gasket is fitted, are provided at different intervals (P), (p) in the longitudinal direction of the gasket and also because the sectional shape of the gasket and the filling rate are taken into consideration, a mounting property is improved, a function of preventing falling can be improved, and falling during tightening can be prevented. Furthermore, by the filling rate in the above-described range, it is possible to set a compression rate at a high value, which greatly contributes to improvement of a sealing property.

The gasket of the invention employed as a gasket for an intake manifold of an engine mounted to an automobile or the like has been described above.

Descriptions in the before described embodiments hold true for the gasket of the invention being employed as a longitudinally-endless gasket (e.g., a rocker cover gasket, a front cover gasket, an oil pan gasket, and a timing chain cover gasket) mounted into a groove portion formed in one of members to provide sealing between this one member and another of the members when they are fastened to each other.

Although the invention has been described above in detail by reference to the accompanying drawings, structures and disposition relationships are only roughly shown in the drawings to such an extent as to allow understanding of the invention. Dimensions, materials, and the like of the respective components in the accompanying drawings and description in the present specification are only examples. Therefore, the invention is not limited to the embodiments described here and in the accompanying drawings and can be changed into various forms without departing from a technical scope grasped from description of claims.

Figure 5A:
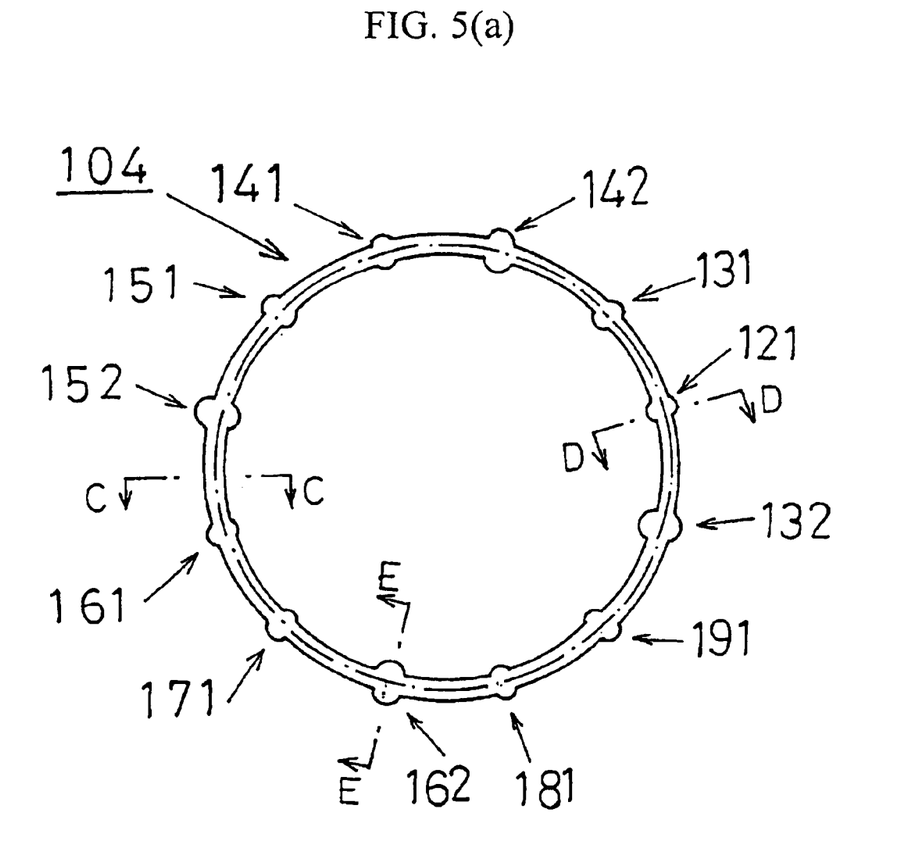

A rubber gasket 104 of the present invention shown in FIG. 5(a) is formed by using acrylic rubber as synthetic rubber material, adding and mixing a rubber chemical agent into the acrylic rubber to have unvulcanized rubber ready, and vulcanizing and molding the unvulcanized rubber into an annular shape by using a mold.

Figures 5B, 5C, 5D:
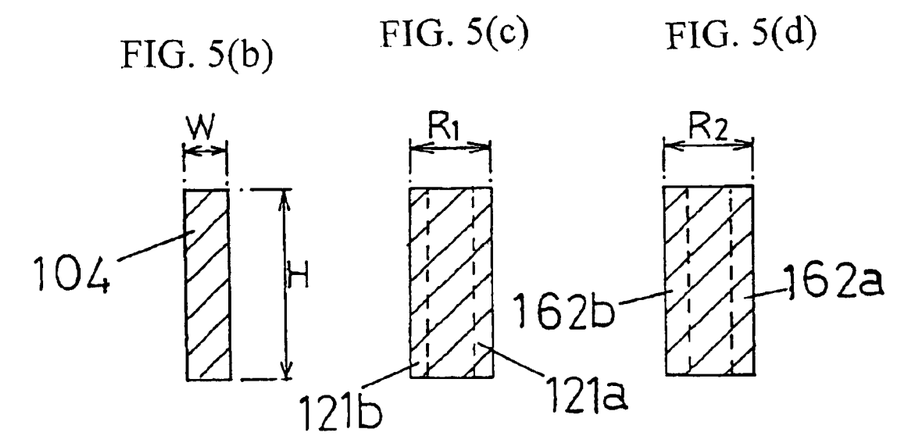

The rubber gasket 104 includes in its longitudinal direction large projecting portions 132, 142, 152, and 162 and small projecting portions 121, 131, 141, 151, 161, 171, 181, and 191. For each of the large projecting portions, projections 162a and 162b are formed symmetrically on opposite side walls of the rubber gasket 104 as shown in FIG. 5(d). For each of the small projecting portions, projections 121a and 121b are formed symmetrically on opposite side walls of the rubber gasket 104 as shown in FIG. 5(c).

In FIG. 5(b), showing a section taken along line C—C in FIG. 5(a), (W)=1.6 mm and (H)=5.7 mm. In FIG. 5(c), showing a section taken along line D—D, (R1)=2.8 mm. In FIG. 5(d), showing a section taken along line E—E, (R2)= 3.2 mm.

An interval between the large projecting portions adjacent to each other in the longitudinal direction of the rubber gasket 104, e.g., an interval between the large projecting portions 132 and 142, is 34.5 mm.

An interval between the large projecting portion 132 and the small projecting portion 121 adjacent to each other in the longitudinal direction of the rubber gasket 104, an interval between the small projecting portion 121 and the small projecting portion 131, and an interval between the small projecting portion 131 and the large projecting portion 142 is 11.5 mm.

The rubber gasket 104 was inserted into a groove portion (having a depth of 4.0 mm, a groove width (X) of 3.0 mm, and a substantially rectangular sectional shape) of an intake manifold.

Portions of the rubber gasket 104 provided with the large projecting portions 132 to 162 were pushed into the groove portion and were inserted into the groove portion while being pressed against opposite inner walls of the groove portion. As a result, other portions including portions provided with the small projecting portions 121 to 191 were pulled by the portions provided with the large projecting portions and could be extremely easily fitted into the groove portion.

Then, the intake manifold was turned around into a state shown in FIG. 1 to face a cylinder head. The intake manifold and the cylinder head were tightened against each other and were fastened to each other to produce a state in which sealing is provided between these members.

During this operation process, there is no fear of the rubber gasket 104 falling from the groove portion, and no fear of displacement of an inserted position of the rubber gasket 104.

A compression rate during tightening was 28%, which was a compression rate high enough to ensure a satisfactory sealing property. A filling rate at this time was 85%.

The gasket of the invention is a longitudinally-endless gasket mounted into a groove portion formed in one of members to provide sealing between these members when they are fastened to each other. For example, a gasket of the invention is mounted into a groove portion formed in a face of an intake manifold disposed to face a cylinder head of an engine mounted to an automobile. The face of the intake manifold in which the groove portion is formed also faces the cylinder head. When the intake manifold and the cylinder head are fastened to each other, the gasket provides sealing therebetween. The gasket is also used as a rocker cover gasket, a front cover gasket, an oil pan gasket, or a timing chain cover gasket.

The gasket of the invention is a gasket which has such excellent workability that mounting and tightening operations can be performed easily, and which can exert satisfactory sealing performance. Therefore, the gasket can be used for a sealing arrangement between an intake manifold and a cylinder head of an engine mounted to an automobile and a sealing arrangement in a rocker cover, a front cover, an oil pan, a timing chain cover, and the like.

What is claimed is:

1. A longitudinally-endless gasket to be mounted within a groove member to provide sealing between the one member and another member when the one member and the another member are fastened to each other, said gasket comprising:

a main body having a sectional shape corresponding to a sectional shape of the groove, with a ratio (H/W) between the a height (H) of said main body in a depth direction of the groove and a width (W) of said main body in a width direction of the groove being 0.8 to 5.0, and large projecting portions and small projecting portions, each of said large projecting portions formed from large projections projecting from opposite side faces of said main body that are to face opposite inner wall faces of the groove, and each of said small projecting portions formed from small projections projecting from said opposite side faces of said main body that are to face the opposite inner wall faces of the groove, wherein adjacent ones of said large projecting portions in a longitudinal direction of said main body are disposed at intervals of 30 to 100 mm, and a width of each of said large projecting portions in the width direction of the groove is larger than a dimension of the groove in the width direction by 0.01 mm to 0.9 mm, wherein adjacent ones of said small projecting portions, or respective adjacent ones of said small projecting portions and said large projecting portions, in the longitudinal direction of said main body are disposed at intervals of 5 to 15 mm, and a width of each of said small projecting portions in the width direction of the groove is smaller than the dimension of the groove in the width direction by 0.01 mm to 0.6 mm such that when the gasket is received within the groove, and prior to the gasket being deformed upon the one member being fastened to the another member, no portion of said each of said small projecting portions is in contact with the opposite inner wall faces of the groove, and wherein a filling rate of the groove by the gasket when the one member and the another member are fastened to each other is 80 to 100%.

2. The gasket according to claim 1, further comprising:
at least one rib on an upper face and/or a lower face of said main body corresponding to a depth direction of the groove.

3. A The gasket according to claim 2, wherein a sectional shape of said main body is substantially rectangular and corner portions of said main body define acute angles.

4. The gasket according to claim 1, further comprising:
ribs at different positions along the width of said main body on an upper face and/or a lower face of the said main body.

5. The gasket according to claim 4, wherein a sectional shape of said main body is substantially rectangular and corner portions of said main body define acute angles.

6. A The gasket according to claim 1, wherein a sectional shape of said main body is substantially rectangular and corner portions of said main body define acute angles.

* * * * *